(12) United States Patent
Engl et al.

(10) Patent No.: US 7,865,755 B2
(45) Date of Patent: Jan. 4, 2011

(54) CLOCK FREQUENCY VARIATION OF A CLOCKED CURRENT CONSUMER

(75) Inventors: Korbinian Engl, Bockhorn (DE); Josef Haid, Graz (AT); Dietmar Scheiblhofer, Kaindorf (AT); Uwe Weder, Au/Hallertau (DE); Bernd Zimek, Graz (AT)

(73) Assignee: Infineon Technologies AG (DE)

( * ) Notice: Subject to any disclaimer, the term of this patent is extended or adjusted under 35 U.S.C. 154(b) by 766 days.

(21) Appl. No.: 11/688,462

(22) Filed: Mar. 20, 2007

(65) Prior Publication Data

US 2007/0257713 A1 Nov. 8, 2007

(30) Foreign Application Priority Data

Mar. 20, 2006 (DE) .................. 10 2006 012 654

(51) Int. Cl.
*H04L 7/06* (2006.01)
*H04L 7/00* (2006.01)

(52) U.S. Cl. ................. 713/400; 713/401; 713/500; 713/501; 713/502; 713/503; 713/600; 713/601

(58) Field of Classification Search ................. 713/400, 713/401, 500, 501, 502, 503, 600, 601
See application file for complete search history.

(56) References Cited

U.S. PATENT DOCUMENTS

| 5,153,535 | A | 10/1992 | Fairbanks et al. | |
| 6,223,297 | B1* | 4/2001 | Inoue | 713/501 |
| 6,788,156 | B2* | 9/2004 | Tam et al. | 331/49 |
| 2003/0006807 | A1* | 1/2003 | Masuda et al. | 327/99 |
| 2004/0073821 | A1 | 4/2004 | Naveh et al. | |

* cited by examiner

*Primary Examiner*—Abdelmoniem Elamin
(74) *Attorney, Agent, or Firm*—Dickstein Shapiro LLP

(57) ABSTRACT

A frequency regulator for varying a clock frequency of a power-supplied consumer operated in a clocked manner, wherein the frequency regulator is implemented to perform an overall variation of the clock frequency from an actual frequency to a set frequency, such that the overall variation is obtained by a plurality of clock changes, each with a different amount of change, wherein each of the respective amounts of change depends on a power change caused by the associated clock frequency change.

13 Claims, 3 Drawing Sheets

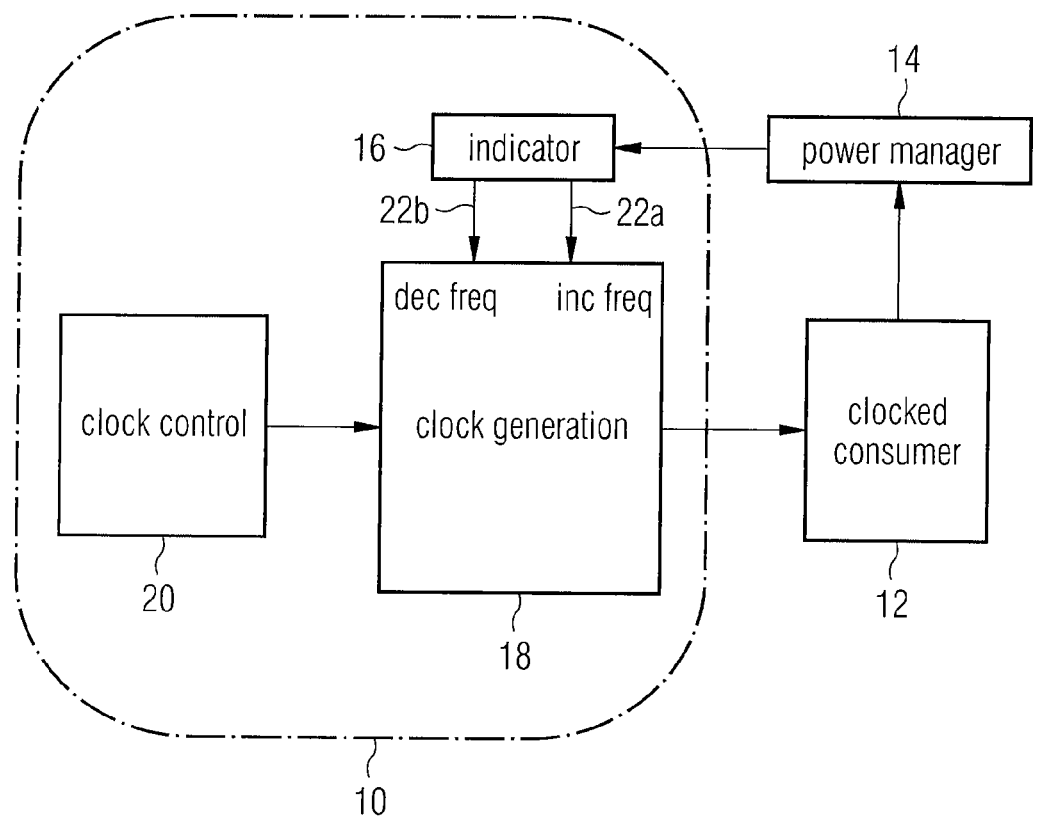

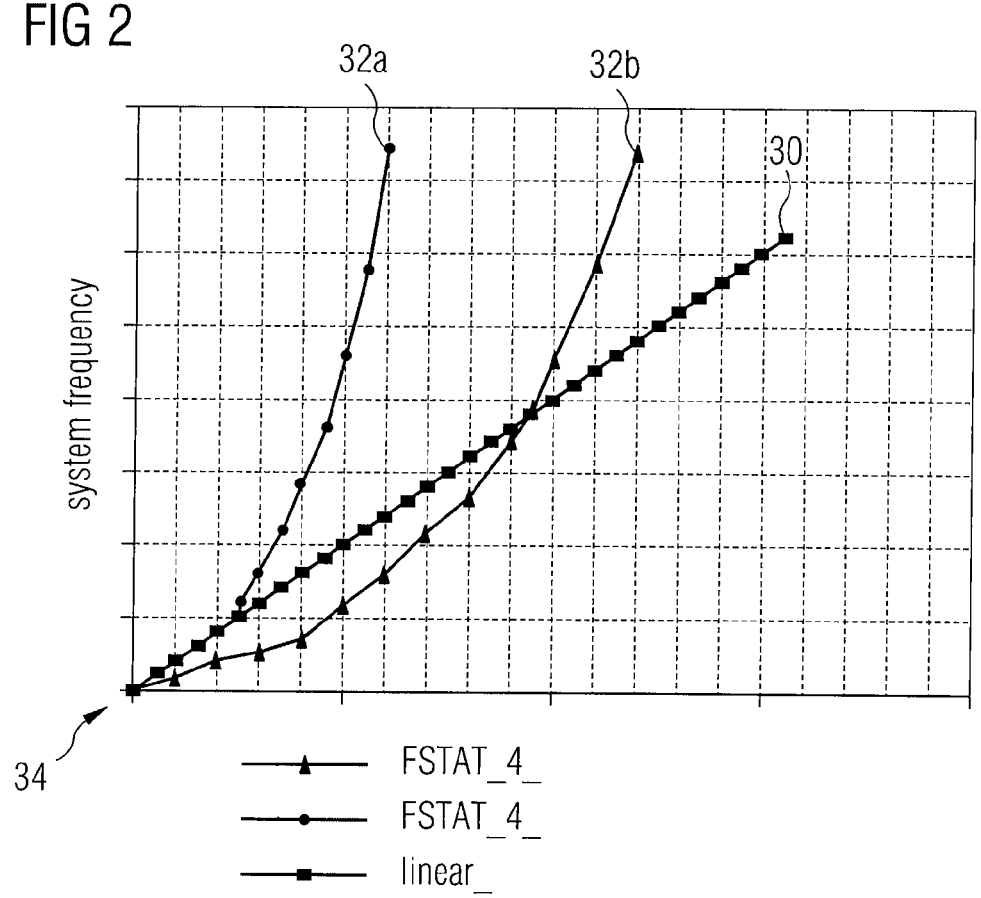

CLOCK FREQUENCY VARIATION OF A CLOCKED CURRENT CONSUMER

CROSS-REFERENCE TO RELATED APPLICATION

This application claims priority from German Patent Application No. 102006012654.8, which was filed on Mar. 20, 2006 and is incorporated herein by reference in its entirety.

TECHNICAL FIELD

The present invention relates to the dynamical variation of the clock frequency of a current consumer operated in a clocked manner, and particularly to the fact how the same can be performed without negative effects on the operating parameters of the current consumer.

BACKGROUND

Applications where the system frequency is dynamically varied in a system operated in a clocked manner, for example to comply with the temporally changing requirements on computing speeds, are numerous. For example, one much-advertised design feature of modern microprocessors is that the same can vary their internal clock frequency depending on the currently occurring processor load in order to reduce the energy consumption of the overall system in a state of lower clock frequency. The energy consumption of the microprocessor is thereby approximately linearly scaled with the used clock frequency, since energy is always consumed when transistors change their switching state, which, for microprocessors and registers, is typically the case once per clock cycle.

In the known methods, the clock frequency of such a system is either increased jump-wise from the current actual frequency to the set frequency, or in several subsequent equidistant clock frequency jumps (linear ramping). One problem with increasing the clock frequency is that the current consumers operated in a clocked manner have to be supplied with a supply voltage to ensure their operability. If the clock frequency is increased, the current consumer requires more current within fractions of a second, since the same scales with the clock frequency, as has been described above. Thus, generally, a supply voltage provided by a voltage regulator will show a voltage drop at a clock frequency increase. Its amount depends on the amount of the changing load, thus on the clock frequency change. If the amount of the clock frequency change per time unit (characteristic control time of the voltage regulator) is too high, it can happen that the voltage drop is so strong that a minimum supply voltage absolutely required for the operation of the current consumer is fallen below. In the worst case, the current consumer is turned off or a reset of a processor is triggered or required, respectively. In the extreme case, this can cause immediate data loss.

When varying the clock frequency of a current consumer operated in a clocked manner, it has to be considered on the one hand that the clock frequency increase has to be performed as fast as possible to ensure the desired operation of a system, but on the other hand the same may not be performed so fast that the current consumer is non-functional due to the lack of sufficient provided electric power.

The known jump-wise switching, which means the variation from the actual frequency to the set frequency in a single step has the great disadvantage that the power drop or voltage drop, respectively, triggered by the clock frequency increase is maximum. In order to ensure the operation of the current consumer at such a frequency variation, the power or voltage supply has to be dimensioned so generously that the same can regulate the maximum clock frequency jump and the resulting high change of the load within the tolerance parameters of the system in the worst operating case. Thus, extremely load-stable and large voltage regulators that are expensive to implement are required in order to tolerate the respective jump-wise increase or reduction of the clock frequency implemented, for example, via fixed frequency dividers, even in a worst-case scenario. The same problem occurs when decreasing the clock frequency, wherein typically overvoltage is generated, which can affect the operability of a clocked current consumer in a similar way as an undervoltage.

In the known methods, which linearly increase the clock frequency from an actual frequency to a set frequency, which means in several single steps per time unit (i.e. with constant $\Delta f/\Delta t$), it is a great disadvantage that the frequency change per step ($\Delta f$) also has to be adapted to the worst case, so that in operating states of the current consumer that do not correspond to the worst-case operating state, a clock frequency increase or reduction can only be accomplished with a speed that is lower than the maximum possible speed. This can possibly have the effect that a processor cannot maintain the desired functionality in a real time system.

BRIEF DESCRIPTION OF THE DRAWINGS

Embodiments will be detailed subsequently referring to the appended drawings, in which:

FIG. 1 is an example for an inventive frequency regulator for varying a clock frequency;

FIG. 2 is a comparison of inventive frequency regulations with known methods;

FIG. 3 is a comparison of voltage drops caused by frequency changes according to the inventive method with known methods;

DETAILED DESCRIPTION

Figure 4:
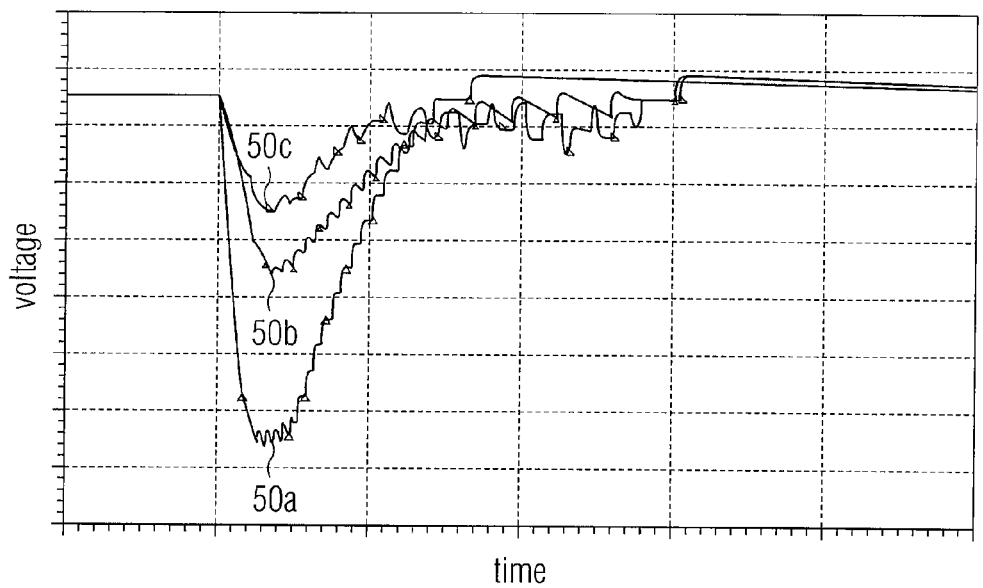
FIG. 4 is examples for a reduction of the operating voltage drop when applying the inventive method.

An embodiment of the present invention may have a frequency regulator for varying a clock frequency of a power-supplied consumer operated in a clocked manner, wherein the frequency regulator is implemented to perform an overall variation of the clock frequency from an actual frequency to a set frequency, such that the overall variation is obtained by a plurality of clock changes, each with a different amount of change, wherein each of the respective amounts of change depends on a power change caused by the associated clock frequency change.

According to another embodiment, a system operated in a clocked manner may have: a power-supplied consumer operated in a clocked manner; a power supply for supplying the consumer with power; and an above-mentioned frequency regulator.

According to another embodiment, a method for varying a clock frequency of a power-supplied consumer operated in a clocked manner may have the step of: performing an overall variation of the clock frequency from an actual frequency to a set frequency such that the overall variation is obtained by a plurality of clock changes, each with a different amount of change, wherein each of the respective amounts of change depends on a power change caused by the associated clock frequency change.

Thereby, the present invention is based on the knowledge that a clock frequency change of a consumer operated in a clocked manner and supplied with power can be performed efficiently and with least possible impact on the power supply supplying the consumer when the whole clock variation is accomplished by a plurality of single clock changes, each with different amounts of change, which means when the clock frequency is varied in a non-linear way.

A non-linear frequency change adapted to the regulator of the supply voltage or the supply power, respectively, can prevent instabilities in the operating amounts (current, voltage) to a large extent, since it has been found out that the load change tolerable by a voltage or power regulator, respectively, depends on the current operating point of the voltage or power regulator, respectively. The non-linear frequency change (and thus the load change) adapted to the regulator can avoid possibly occurring instabilities to a large extent, wherein additionally in a given allowed respective voltage or power variation of the regulator ($\Delta p$ or $\Delta V$) the performance, which means the speed of regulation ($\Delta f/\Delta t$) can even be increased.

In one embodiment, the regulating characteristic of a voltage regulator, which supplies the current consumer operated in a clocked manner with an operating voltage, is considered for regulating the clock frequency from a frequency regulator, in order to perform a required clock frequency change in a non-linear way such that the voltage drop or the overvoltage, respectively, caused by the clock frequency change remains within a previously fixed tolerable range.

This has the advantage that in the known given regulator, not only such frequency jumps that allow, even in the worst case of the operation, guaranteed functioning of the current consumer, are allowed, but that above that significantly higher frequency changes per unit are allowed when a system is not in this mode of operation. This is normally the case when the current consumer is operated with a clock frequency, which lies above a minimum possible clock frequency of the current consumer. If the current consumer is at minimum clock frequency, the same has the least current consumption. At a clock frequency increase from this low output level, the resulting relative load change at the output of the regulator is extremely high and can be several 100%. Exemplarily, a system is considered here that can be operated in a dynamical clock frequency range up to the 40-fold of a base frequency $f0$, and that, ideally, consumes the same current depending on an operating frequency $f0$, wherein the clock frequency is to be controllable in integer steps of $f0$.

If the system is at a clock frequency of $25*f0$ in the starting state, and the clock frequency is to be increased by $f0$, this implies an increase of the load at the regulated output of the voltage regulator by merely $\frac{1}{25}$ of the original load, so that the voltage regulator can easily correct this dynamical load change.

However, if the same system is at the base frequency $f0$ in the starting state, the desired clock frequency increase implies a load change of 100%, so that the voltage drop to be expected will be significantly higher with the same absolute increase of the clock frequency than the above-described case. Thus, typically, a fixed change of the dynamic current causes a larger voltage drop in the lower frequency range than in the upper frequency range.

An inventive frequency regulator uses this non-linearity of the system by changing the clock frequency (operating frequency) in a non-linear way. The characteristic of the frequency change per time unit (f-t curve) is tuned to the characteristics of the regulator and is thus not linear.

A great advantage is that a clock frequency change can be accomplished significantly faster when an existing system of a voltage or a power regulator, respectively, and clocked power consumer is operated according to the invention, since the same is already configured for the worst case occurring in the lower frequency range, so that significantly higher clock jumps become possible in the upper frequency range. This allows the increase or reduction of the clock frequency in less time.

FIG. 1 shows an example for an inventive frequency regulator during application.

A frequency regulator 10, a consumer 12 operated in a clocked manner and a power manager 14 are shown.

The frequency regulator 10 comprises a frequency indicator 16, a clock generator 18 and a clock controller 20.

The clock generator 18 of the frequency regulator 10 is connected to the consumer 12 and generates the system clock required for operating the consumer 12. The consumer 12 is optionally connected to the power manager 14.

In a simple embodiment, the power manager 14 is not connected to the consumer 12 and has, for example, a register, where a user can set the target frequency to which then a non-linear regulation is performed in accordance with the invention.

In a more complex implementation, the power manager 14 can monitor or control, respectively, additional system parameters, for evaluating the currently present system or computing power, respectively (also by using further external factors, such as the measured supply voltage). Thereby, the power manager 14 can be connected to the consumer 12, for example for considering the actual frequency or the current utilization of the consumer, respectively.

Thus, the power manager 14 analyzes the power available in the system by using several factors, and is connected to the frequency indicator 16 to indicate to the same that an increase or reduction of the clock frequency, respectively, is required for reaching an optimum operating state. An increase can be motivated by the fact that the currently available computing power is too low to fulfil the requirements made on the system. A reduction can also be caused by the fact that the current computing power is too high, so that energy can be saved by reducing the clock frequency. On the other hand, alternatively, it is also possible that the clock frequency is to be reduced when external operating parameters, such as the provided supply voltage, are currently not able to provide the power required by a high system clock when the same has to provide at the same time, for example, the power for other system components. Then, it can be required to reduce the clock frequency although thereby the processing of, for example, program code by the consumer 12 is slowed down. The desired reduction and/or increase of the clock frequency (which means the target frequency) can also be set for the power manager 14 by an external user in a simple configuration, as has already been mentioned above.

In order to indicate a desired frequency increase or frequency reduction, the power manager 14 is connected to the frequency indicator 16 of the frequency regulator 10. Within the frequency regulator 10, the frequency indicator 16 is connected to the clock generator 18 and signalizes the same an increase of the clock frequency via a first signal path 22a and a reduction of the clock frequency via a second signal path 22b. Signalizing is performed until the frequency indicator determines that the set state has been reached based on the information of the power manager 14.

The clock generator 18 physically generates the clock frequency for operating the consumer 12. Thereby, in dependence on the information transmitted via the signal paths 22a and 22b, the current clock frequency is either maintained, increased or reduced. According to the invention, the clock generator 18 is connected to a clock controller 20, which presets the step width of the frequency jumps in dependence on the system state. By the variable step width, a system-dependent frequency change speed and thus a non-linear frequency regulation of the clock generator 18 is obtained.

Thereby, the clock controller 20 can, for example, be realized as a hardwired logic which presets an amount of change of the clock frequency at a given clock frequency in dependence on the given clock frequency. Thereby, this dependence can be stored in a fixed way in the form of a table, which is determined once during system design. When designing the system, first the power consumption of the consumer 12 is determined. Then, a supply voltage regulator or a power supplier, respectively, which supplies the consumer with an operating power and has a specific regulating characteristic, can be selected. By knowing the dynamic current consumption or the dynamic power consumption, respectively, of the consumer 12 and the regulator characteristics, the clock controller 20 can be implemented such that in any operating state of the consumer the clock frequency change is performed such that an unavoidable supply power change or supply voltage change, respectively, caused by the dynamic load change, remains below a predetermined tolerable maximum value. Thus, the non-linearity of the regulation achieves that an optimum change speed of the clock frequency is obtained at every operating time, or that, for example, the variation of the supply voltage, respectively, which is caused by the clock change, is limited to a fixed measure that remains constant within the whole possible dynamic clock frequency range. Thereby, the clock controller 20 can also be implemented such that the same evaluates an analytic function in dependence on measured operating parameters, such as the current clock frequency and the current voltage level, in order to implement the inventive concept.

In the following, it is illustrated with regard to FIGS. 2 to 4 how a non-linear characteristic of an inventive frequency regulator can be selected and how the operating parameters of a current consumer operated in a clocked manner behave when applying the inventive concept.

FIG. 2 shows a graph where the time is plotted on the x-axis in arbitrary units, and where a clock frequency for operating a consumer is plotted on the y-axis, also in arbitrary units. Thereby, a known linear frequency regulation is illustrated based on a graph 30, as well as an inventive first non-linear frequency regulation 32a and a second non-linear frequency regulation 32b. Thereby, the frequency regulations are provided for the same consumer operated in a clocked manner, wherein the known linear frequency regulation has to be selected such that in the worst-case mode of operation, a clock frequency does not cause a large drop of a supply voltage or a supply power, respectively. As has already been described above, the power or voltage variations, respectively, in the lower clock frequency range are thereby the limiting factors so that the increase of the linear frequency regulation 30 ($\Delta f/\Delta t$) has to be set in a range 34 of the lowest clock frequencies. FIG. 2 shows exemplarily a clock frequency change that is accomplished from the base frequency up to a maximum frequency.

When applying the inventive concept of non-linear frequency regulation, as described by the first non-linear frequency regulation 32a, it becomes clear that an increase of the system frequency to the maximum system frequency is enabled during a time that is significantly shorter compared to applying a known linear frequency regulation 30. In the example shown in FIG. 2, the time difference for reaching the maximum system frequency is higher than a factor of 3. Thereby, the non-linear frequency regulation 32a is the fastest possible implementation of the non-linear regulation, which is expressed by the fact that the increase of the non-linear frequency regulation 32a for small frequencies corresponds to the increase of the linear frequency regulation 30. Thus, the non-linear frequency regulation 32a is selected such that the same causes the maximum allowed voltage or power change, respectively, at low frequencies. By the non-linearity, this maximum allowed variation is also used for higher frequencies, which is not the case in the case of the linear frequency regulation 30, so that the overall observed obvious speed increase (performance increase) for achieving the maximum system frequency results, compared to the linear frequency regulation 30. This has the overall advantage that a reaction to dynamic load changes when applying the inventive concept can be accomplished much faster than with known methods, and thus latency times occurring due to frequency change can be kept significantly shorter.

The second non-linear frequency regulation 32b describes a frequency regulation that is implemented less aggressively than the first non-linear frequency regulation 32a, wherein at a clock frequency change, depending on the frequency step, a supply power variation or a supply voltage variation, respectively, will be smaller, than in the case of the linear frequency regulation 30 or the first non-linear frequency regulation 32a. This is shown in that the initial increase of the second non-linear frequency regulation 32b at lower clock frequencies is significantly lower than in the case of the linear frequency regulation 30 and the first non-linear frequency regulation 32a. Here, it has to be considered that the time passing when regulation from the base frequency to a maximum operating frequency is performed by the second non-linear frequency regulation 32b, is all in all less than in the case of the linear frequency regulation 30, although the maximum occurring supply voltage variations or supply power variations, respectively (at low frequencies) are significantly lower than in the case of the linear frequency regulation 30.

Thus, advantageously, according to the invention, it is possible to significantly increase the performance (the time required for increasing a frequency change) compared to known systems. Further, according to the invention, it is now possible to obtain an optimum compromise between speed of the clock frequency increase and variation of the supply voltage or the supply power, respectively, with already given hardware (current consumer and power supply) by varying different non-linear regulation curves.

Since frequency scaling is possible in systems that are controlled, for example, by a power management unit, a broad field of application presents itself for the inventive frequency regulation, particularly for systems with dynamically changing workloads or changing environmental parameters, respectively (current limits, external voltage drops).

FIG. 3 shows a table that shows how a maximum observed voltage drop can be reduced at a current consumer operated with a supply voltage compared to the corresponding known method, by applying an inventive frequency regulator with non-linear frequency regulation. Here, a system is considered that has an idealized dynamic current consumption, which depends on the clock frequency in a linear way. A clock frequency change is considered, which is performed from a minimum operating frequency to the maximum possible clock frequency.

In the table shown in FIG. 3, the observed voltage drop is plotted in a table row 40 in relative units to the maximum observed voltage drop, wherein a first column 42a indicates the voltage drop for the case that no continuous frequency ramping is performed, which means the clock frequency is increased from the minimum operating frequency to the maximum possible clock frequency in a single clock step. The second column 42b shows the case of linear frequency ramping (in 5 steps), and the third column 42c shows the case of inventive non-linear clock frequency variations, wherein the time in which the maximum clock frequency is obtained also amounts to 5 steps. As can be seen in FIG. 3, as expected, the voltage drop is highest at a more instantaneous, i.e. unregulated voltage increase by one single clock step. Although the overall regulation time for obtaining the maximum clock frequency for the inventive non-linear frequency regulator and the linear frequency regulator is identical (5 steps), the observed voltage drop during inventive varying of the clock frequency is by approximately 50% lower than during linear varying.

FIG. 4 shows a voltage curve of a voltage regulator as it is established when a clock frequency of a consumer operated with a supply voltage via the voltage regulator is changed. Thereby, the time is indicated in arbitrary units on the x-axis, and the supply voltage in arbitrary units on the y-axis. The case described with regard to FIG. 3 is illustrated, wherein a first graph 50a shows the case of an instantaneous clock frequency change corresponding to column 42a, where the maximum voltage change results. A second graph 50b describes the voltage variation during linear varying of the clock frequency. A third graph 50c describes the inventive non-linear varying of the clock frequency, wherein the overall lowest voltage drop of the supply voltage is established.

The system characterized based on FIG. 3 and FIG. 4 is selected such that the linear and the non-linear regulation allows the increase of a clock frequency from a minimum clock frequency to a maximum clock frequency in the same time. The fact that a non-linear characteristic can be selected such that the same maximum regulation time results and that, when applying an inventive frequency regulator, a significantly lower voltage regulation is established, emphasizes again the high variability of the inventive concept. In the example shown in FIG. 4, with the same speed of frequency increase, a less robust voltage regulator can be used, which offers less reserves and can thus be implemented in a more space-saving and cost-effective way.

Figure 5:
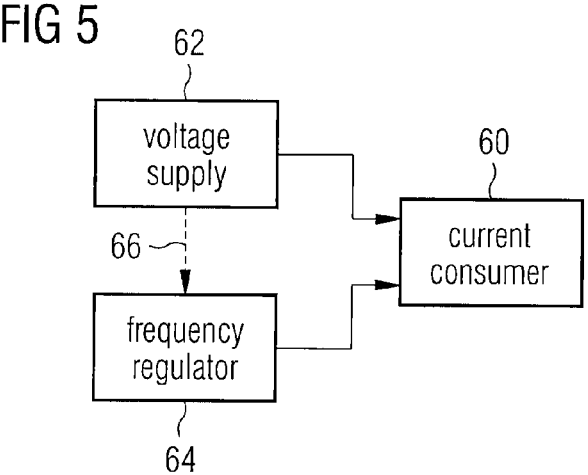
FIG. 5 is an example for an inventive system with variable clock frequency.

FIG. 5 shows an example for an inventive system with a consumer 60 operated in a clocked manner, a regulated voltage supply 62 (power supply) and an inventive frequency regulator 64. The current consumer 60 is connected to the voltage supply 62 and obtains the supply voltage required for its operation from the same. The clock frequency required for operating the current consumer 60 operated in a clocked manner is generated by an inventive frequency regulator 64, which is why the same is connected to the current consumer 60.

At a required clock frequency increase or reduction, the inventive frequency regulator 64 regulates the clock frequency such that a voltage supply change at the voltage supply 62 caused by the dynamically changing clock frequency of the current consumer 50 remains below a predetermined limiting value.

Alternatively or additionally, the voltage supply 62 can be connected to the frequency regulator 64 via a monitor connection 66, such that the frequency regulator 64 receives information about the operating voltage actually generated by the voltage supply 62, for determining the respective amounts of change for the individual clock frequency changes based on this information, so that the supply voltage change of the voltage supply 62 remains within a predetermined range.

While it has been described in the above-described embodiment that the inventive frequency regulation is based on the variation of the supply voltage or that the inventive frequency regulation can avoid that a supply voltage drop exceeds a predetermined value, respectively, the application of the inventive concept is in no way limited to voltage regulators. Rather, advantageously, the inventive concept can be applied to any type of power supply of a power consumer operated in a clocked manner, which means particularly also to constant current sources.

The way in which information about the amounts of change of the individual clock frequency changes are generated or maintained according to the invention is insignificant for the successful application of the inventive concept of non-linear frequency regulation. The individual amounts of change can either be previously determined and stored or can also be dynamically generated in any way, wherein, for example, a functional dependence of the amounts of change of other operating parameters of an inventive system can be used.

The shown implementation of an inventive frequency regulator 10 is also exemplary. The inventive frequency regulator can be implemented as a discrete independent device. However, the type of implementation of the frequency regulator is not significant for the successful application of the inventive concept. Thus, an inventive frequency regulator can also be implemented inside the consumer 12. This applies in the same way to the power or voltage supply, respectively, associated to the same.

Alternatively, the frequency regulator can also be implemented within the voltage regulator, so that the same can access the regulation characteristic of the frequency regulator either by direct measurement or also have a mathematical model of the regulator characteristic to calculate the regulator behavior in advance in order to derive the individual amounts of change of the clock frequency change based on the precalculated information.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A frequency regulator for varying a clock frequency of a power-supplied consumer operated in a clocked manner, wherein the frequency regulator is implemented to perform an overall variation of the clock frequency from an actual frequency to a set frequency, such that the overall variation is obtained by a plurality of clock changes, each with a different amount of change, wherein each of the respective amounts of change depends on a power change caused by the associated clock frequency change such that the power changes caused by the associated clock frequency changes remain below a predetermined threshold, and wherein amounts of changes are higher at higher clock frequencies and lower at lower clock frequencies.

2. The frequency regulator according to claim 1, wherein the frequency regulator is implemented to use such respective amounts of change that a supply voltage change of a supply voltage of the consumer caused by the associated clock frequency change remains below a predetermined voltage threshold.

3. The frequency regulator according to claim 2, wherein the voltage threshold is lower than 10 percent of the supply voltage.

4. The frequency regulator according to claim 1, wherein the frequency regulator is implemented to determine the respective amounts of change by considering the actual frequency.

5. The frequency regulator according to claim 4, wherein the frequency regulator is implemented to calculate the respective amounts of change as an analytical function of the actual frequency.

6. The frequency regulator according to claim 4, wherein the respective amounts of change for every actual frequency are predetermined in a fixed manner.

7. A system operated in a clocked manner, comprising:
a power-supplied consumer operated in a clocked manner;
a power supply for supplying the consumer with power; and
a frequency regulator for varying a clock frequency of the power-supplied consumer operated in a clocked manner, wherein the frequency regulator is implemented to perform an overall variation of the clock frequency from an actual frequency to a set frequency, such that the overall variation is obtained by a plurality of clock changes, each with a different amount of change, wherein each of the respective amounts of change depends on a power change caused by the associated clock frequency change such that the power changes caused by the associated clock frequency changes remain below a predetermined threshold, and wherein amounts of changes are higher at higher clock frequencies and lower at lower clock frequencies.

8. The system according to claim 7, wherein the frequency regulator is implemented to determine the respective amounts of change in dependence on a regulation characteristic of the power supply.

9. A method for varying a clock frequency of a power-supplied consumer operated in a clocked manner, comprising:
performing an overall variation of the clock frequency from an actual frequency to a set frequency such that the overall variation is obtained by a plurality of clock changes, each with a different amount of change, wherein each of the respective amounts of change depends on a power change caused by the associated clock frequency change such that the power changes caused by the associated clock frequency changes remain below a predetermined threshold, and wherein amounts of changes are higher at higher clock frequencies and lower at lower clock frequencies.

10. A system operated in a clocked manner, comprising:
a power-supplied consumer operated in a clocked manner;
a power supply for supplying the consumer with power; and
a frequency regulating means for varying a clock frequency of the power-supplied consumer operated in a clocked manner, and for performing an overall variation of the clock frequency from an actual frequency to a set frequency, such that the overall variation is obtained by a plurality of clock changes, each with a different amount of change, wherein the respective amount of change depends on a power change caused by the associated clock frequency change, such that the power changes caused by the associated clock frequency changes remain below a predetermined threshold, and wherein amounts of changes are higher at higher clock frequencies and lower at lower clock frequencies.

11. A system operated in a clocked manner, comprising:
a power-supplied consumer operated based on a system clock frequency; and
a frequency regulator comprising:
a frequency indicator for indicating a required increase or decrease in the system clock frequency;
a clock generator for generating and supplying the system clock to the consumer at a frequency based on the indication of the frequency indicator; and
a clock controller for presetting step widths of system clock frequency changes depending on system power changes caused by the respective associated system clock frequency changes such that the power changes caused by the associated clock frequency changes remain below a predetermined threshold, and wherein amounts of changes are higher at higher clock frequencies and lower at lower clock frequencies.

12. The system according to claim 11, further comprising a power manager for indicating to the frequency indicator the required increase or decrease in the system clock frequency.

13. The system according to claim 12, wherein the power manager is connected to the consumer to indicate to the frequency indicator the required increase or decrease in the system clock frequency based on the actual frequency or current utilization of the consumer.

* * * * *